(12) United States Patent
Hoose (10) Patent No.: US 6,241,391 B1
(45) Date of Patent: Jun. 5, 2001

(54) VEHICLE SUSPENSION AND BEARING THEREFOR

(76) Inventor: Howard Hoose, Onesquethaw Creek Rd., Feura Bush, NY (US) 12067

( * ) Notice: Subject to any disclaimer, the term of this patent is extended or adjusted under 35 U.S.C. 154(b) by 0 days.

(21) Appl. No.: 09/421,577

(22) Filed: Oct. 20, 1999

Related U.S. Application Data (63) Continuation-in-part of application No. 08/848,517, filed on Apr. 28, 1997, now Pat. No. 6,017,047.
(51) Int. Cl.[7] ............................. F16C 31/00; B62K 1/00
(52) U.S. Cl. ..................... 384/49; 188/322.16; 280/276
(58) Field of Search ......................... 384/49, 51, 55; 464/167; 280/276; 188/322.19

(56) References Cited

U.S. PATENT DOCUMENTS 3,112,625 * 12/1963 Leto ................................. 464/167 X
3,631,765 * 1/1972 Neumeister ........................ 384/49 X
4,306,638 * 12/1981 Malott ............................. 188/322.16
4,660,683    4/1987 Hayashi et al. .................... 188/18 A
5,044,648 *  9/1991 Knapp ................................ 280/283
5,380,026    1/1995 Robinson ............................ 280/276
5,725,226 *  3/1998 Cabrerizo-Pariente ............. 280/276

* cited by examiner

Primary Examiner—Thomas R. Hannon
(74) Attorney, Agent, or Firm—Hoffman, Warnick & D'Alessandro LLC; Spencer K. Warnick (57) ABSTRACT

A vehicle suspension and bearing therefor providing improved slidability of members and torque resistance. The bearing includes a first member with at least one guide track, a second member with rolling element openings and a collar positioned within the second member to rotatably receive rolling elements positioned within the rolling element openings and guided by the at least one guide track.

24 Claims, 8 Drawing Sheets

VEHICLE SUSPENSION AND BEARING THEREFOR

This application is a continuation-in-part application of U.S. Ser. No. 08/848,517, filed Apr. 28, 1997, U.S. Pat. No. 6,017,047.

BACKGROUND OF THE INVENTION

1. Technical Field

The present invention relates generally to a suspension for a two-wheeled vehicle and the two-wheeled vehicle with such a suspension. More particularly, the present invention relates to a two-wheeled vehicle suspension having two shock absorbing systems independently operable between a two-wheeled vehicle's frame and wheel.

Furthermore, the invention relates to a vehicle suspension and a bearing therefor.

2. Related Art

Heretofore, the related art has provided two wheeled vehicle suspensions, e.g., motorcycle or bicycle suspensions, containing only one shock absorbing member between the steering column and wheel. While these suspensions have been generally satisfactory, when rough terrain is encountered, the suspensions are limited to the stroke of the single shock absorber. Accordingly, once the single shock absorber has "bottomed out," the rider is subjected to direct transmittal of the ground undulations.

Another disadvantage of single shock absorber systems is their inability to adequately prevent torque transmission to the suspensions and still operate correctly. Inoperativeness is created by twisting of the telescopic suspension members to an extent that they do not slide smoothly relative to one another.

SUMMARY OF THE INVENTION

It is an advantage of the present invention to overcome the above mentioned deficiencies in the related art. In order to achieve this, the present invention provides a wheel suspension including: at least one elongate member having a first end and second end, a first shock absorber connected to the first end of the elongate member and a second shock absorber connected to the second end of the elongate member such that the first and second shock absorber act independently. As a result, the suspension can operate to cushion the ride with two shock absorbers that may be set to the same pressure or different pressures according to the operator's liking.

A further feature of the present invention is found in how the teachings of the present invention can be advantageously applied to a forked suspension of any wheeled vehicle and, in particular, any two-wheeled vehicle, e.g., a motorcycle or bicycle. When used on a two wheeled vehicle, the suspension members may be used to form a front fork such that the first shock absorber is attached to the steering column via a steering column frame and to the forks of the suspension. Through the shock absorber and fork connection, the structure adds further rigidity to the suspension, hence, preventing twisting of the forks when used to steer the vehicle.

Another advantage of the present invention is the selectability of the shock absorber members. For instance, a hydraulic piston/cylinder system, a pneumatic piston/cylinder system, or a spring-based system, are all equally applicable within the scope of the present invention.

A further feature of the present invention is its capability to be retrofitted to older vehicles.

The present invention also includes a bearing comprising: a first member having at least one bearing track, each bearing track adapted to rotatably guide a rolling element received therein; a second member telescopically arranged with the first member and having a first rolling element opening in registration with each bearing track of the first member, each first rolling element opening rotatably receiving a rolling element therein; and a first collar positioned within the second member and having a rolling element seat for each rolling element, each seat rotatably receiving a rolling element therein. The invention also includes a vehicle suspension incorporating the above bearing wherein one of the first and second members is coupled to a wheel and the other member is coupled to a frame of a vehicle. This embodiment provides a bearing and suspension capable of resisting torque while also assuring slidability of its members. Another advantage provided by this bearing is that telescoping members, e.g., in a suspension, can mate without the need for a protective rubber boot to prevent debris from penetrating the system. In contrast, all of the bearing components are sealingly protected within the members.

Another aspect of the invention provides a bearing including: a stationary outer member having three bearing tracks on an interior of the stationary outer member; a bearing track race received in each bearing track to prevent wear of the bearing track and rotatably guide a rolling element received therein; a moving inner member having a rolling element opening in registration with each bearing track, each opening rotatably receiving a rolling element therein; and a first collar coupled to the moving inner member and having a rolling element seat for each rolling element, each seat rotatably receiving a rolling element therein. This embodiment provides similar features as the above described bearing and suspension.

Another aspect of the invention includes a bearing comprising: a first collar; a second collar; at least one rolling element seat positioned in each collar for receiving a rolling element therein; and a rotational counteracting mechanism to force the first collar and the second collar in opposing rotational directions. A preferred rotational counteracting mechansim includes: a first angled sliding surface on an end of the first collar; a second angled sliding surface on an end of the second collar that is slidingly matable with the first angled sliding surface; a compression mechanism to apply a longitudinal force to the first and second collars to force them longitudinally together; and wherein the first sliding surface and second sliding surface slidingly mate to transform the longitudinal force into a counteracting rotational force. This embodiment provides a bearing capable of resisting torque while also assuring slidability of its members and even wear by its rolling elements against mating members. It also removes the need for a protective rubber on telescoping members, e.g., in a suspension.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

While the present invention will be described in conjunction with a two wheeled vehicle, e.g., a motorcycle or bicycle, it should be noted as self-evident that the invention may be utilized in a variety of vehicle suspensions not illustrated herein. Furthermore, while embodiments of the invention are illustrated for use with one of a front fork or rear suspension of a two-wheeled vehicle, it should be noted that the inventions are equally applicable to either the front or rear suspension of a vehicle.

Figure 1:
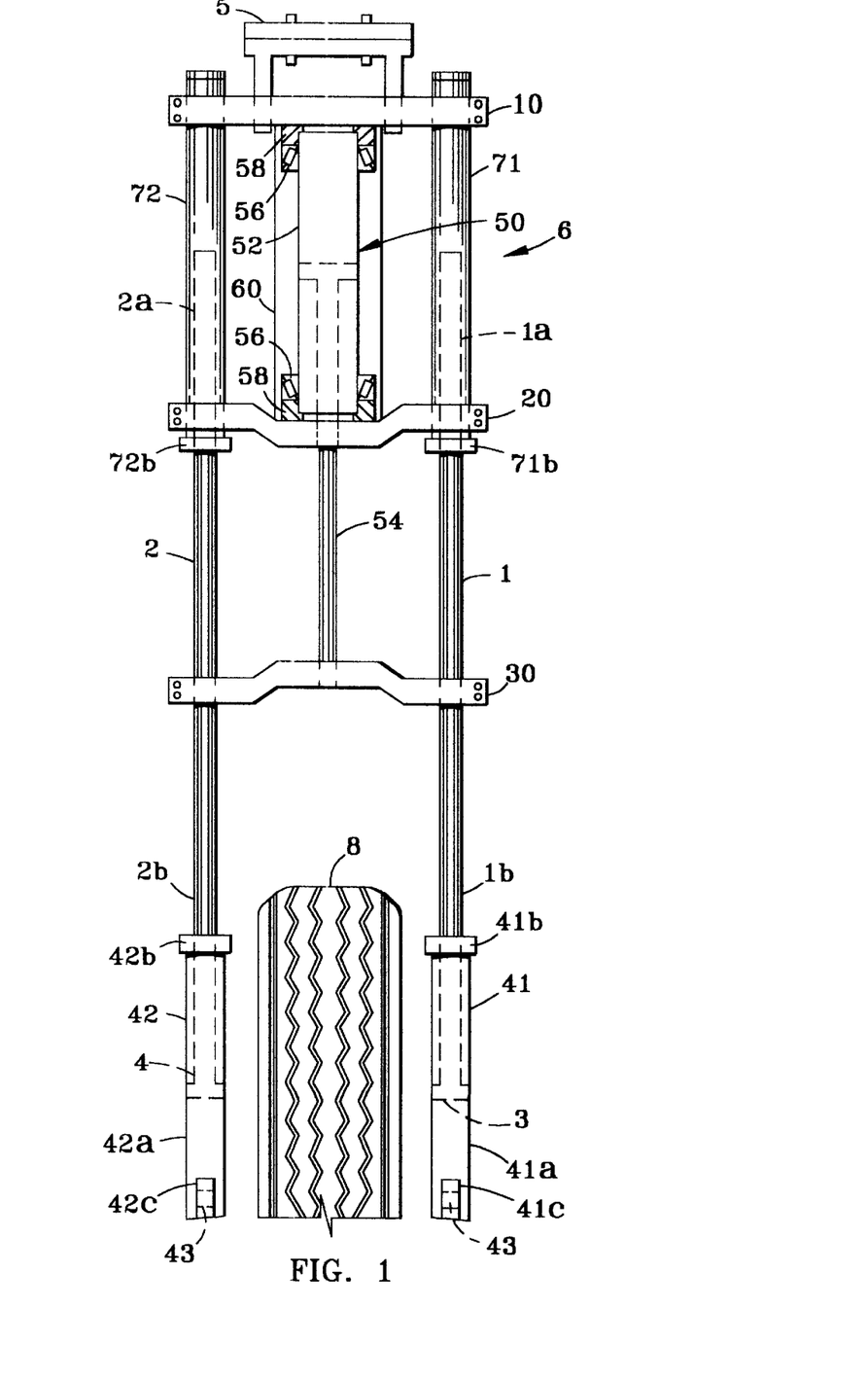
FIG. 1 shows a front view of a suspension in accordance with a first embodiment of the present invention.

FIG. 1 shows a front view of the wheel suspension in accordance with the present invention. The suspension includes a pair of elongate members 1, 2, which act as a forked suspension, for example, for a motorcycle or bicycle. The elongate members 1, 2 may be constructed as solid rods or tubular members, and are conventionally formed of tempered steel.

At the lower ends 1b, 2b of each of the elongate members 1, 2, a lower shock absorber 41, 42 is provided. Each of the lower shock absorbers 41, 42 include a sleeve 41a, 42a which telescopically receive the lower ends 1b, 2b of the elongate members 1, 2. The sleeves 41a, 42a each include a seal 41b, 42b, which seal the lower ends 1b, 2b of the elongate members inside the sleeves 41a, 42b. The lower ends of the sleeves 41a, 42a are also sealed, for example, by a plate welded to close off their lower openings.

To form a shock absorber, the lower ends 1b, 2b of the elongate members may include pistons 3, 4. In this way, the elongate members 1, 2 and sleeves 41, 42 form a sealed shock absorber when pressurized fluids, e.g. air or hydraulic fluid, are injected in the chambers formed between the pistons 3, 4 and the ends of the sleeves 41, 42. The resulting system is commonly referred to as a pneumatic piston/cylinder system or a hydraulic piston/cylinder system depending on the fluid used. As will be readily recognized by one having ordinary skill in the art, the chambers of the systems may be connected for fluid communication to reservoirs of pressurized fluid (not shown) for adjustability.

Figure 7:
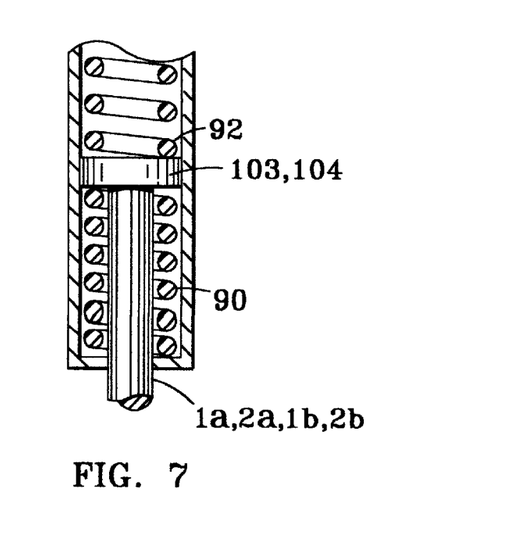
FIG. 7 shows a cross-sectional view of a spring-based shock absorber in accordance with an alternative embodiment of the present invention.
Figure 8:
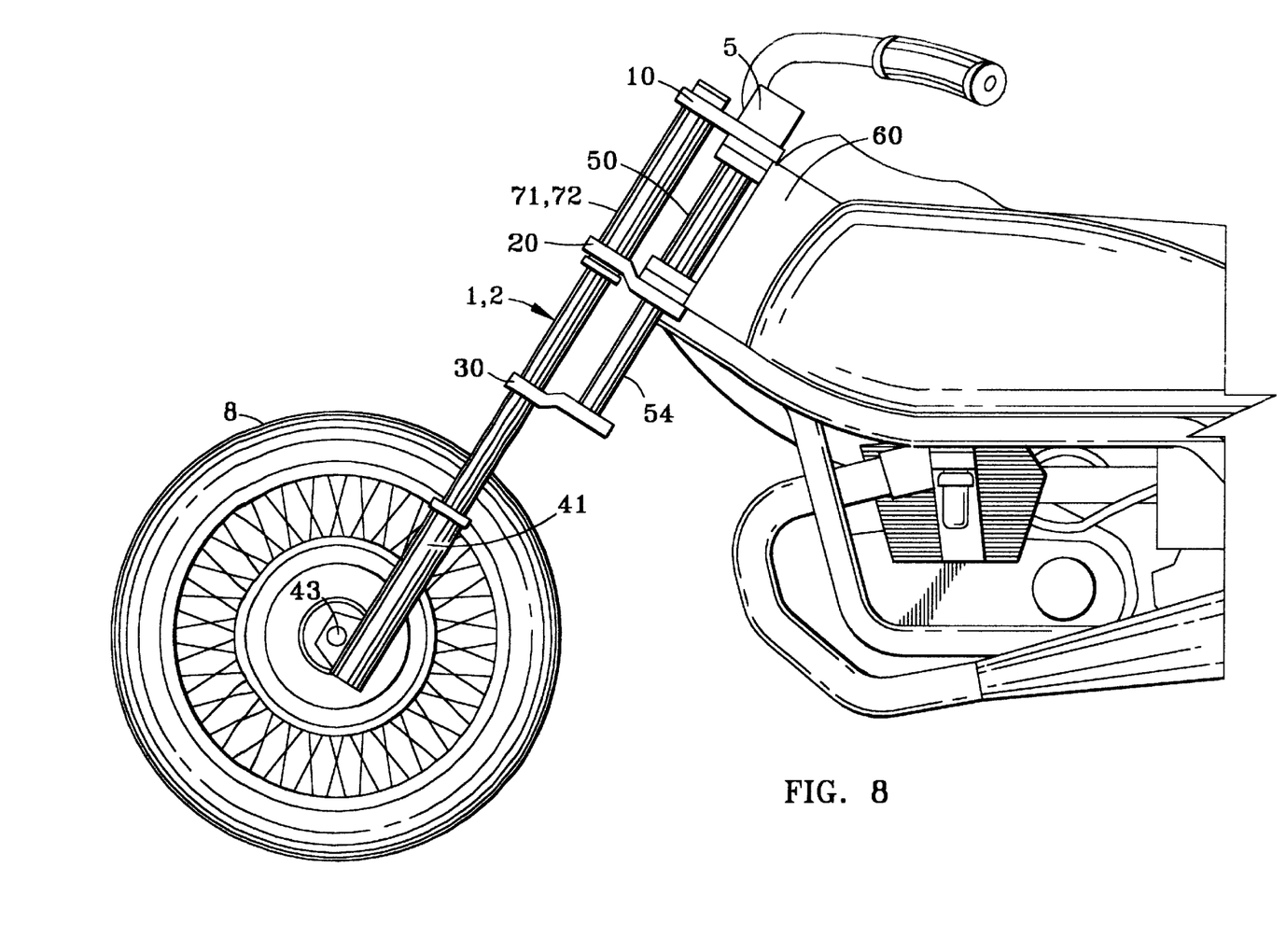
FIG. 8 shows a vehicle incorporating the suspension in accordance with FIG. 1.

Alternatively, as shown in FIG. 7, the lower shocks 41, 42 may be created by a spring-based system. In this alternative embodiment, a spring 90 is placed below the piston 103, 104 and a spring 92 is placed above the piston 103, 104 to form a bidirectional cushion.

At a lowermost portion of the shock absorber sleeves 41a, 42a, plates 41c, 42c are fixedly attached. The plates 41c, 42c include aligned apertures 43 therethrough to support an axle of a vehicle-supporting wheel 8. Hence, as the wheel travels along its path, the shock absorbers 41, 42 absorb the undulations to prevent transmittal thereof up the elongate members 1, 2.

When the suspension is used on a front of a two wheeled vehicle it is necessary for the suspension to provide steering. In order to provide steerability, at the upper ends 1a, 2a of the elongate members, a steering frame 6 is provided. The steering frame 6 includes a pair of sleeves 71, 72 which telescopically receive the upper ends 1a, 2a of the elongate members 1, 2. The sleeves 71, 72 are fixedly attached by a pair of triple clamps 10, 20.

Figure 2:
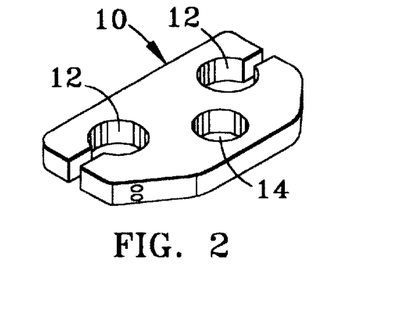
FIG. 2 shows an isometric view of a suspension component in accordance with the present invention.

FIG. 2 shows triple clamp 10. The plate 10 includes a pair of generally circular openings 12 with slots therein for changing the size of the apertures by tightening or loosening of at least one adjustable fastener (not shown). The clamp 10 also includes an aperture 14 positioned centrally in the plate but non-collinearly with the apertures 12. In accordance with the present invention, as shown in FIG. 1, the upper portions of sleeves 71, 72 are positioned in the apertures 12 and fixedly attached by tightening of the adjustable fastener.

Figure 3:
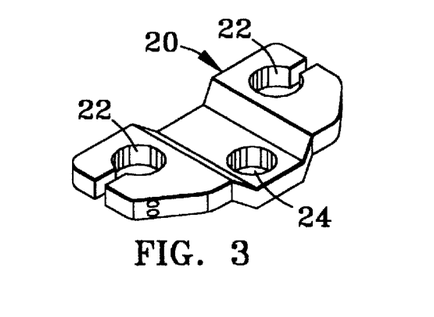
FIG. 3 shows an isometric view of a second suspension component in accordance with the present invention.

FIG. 3 shows the triple clamp 20, which is provided as a "dove-wing" triple clamp. The clamp 20 is formed of a cast or bent steel or aluminum plate with two co-planar outer sections and an intermediate lowered section. The clamp 20, similarly to clamp 10, includes a pair of adjustably sized apertures 22 through which the lower portions of sleeves 71, 72 are fixedly positioned by tightening of at least one adjustable fastener (not shown). The triple clamp 20 also includes an aperture 24 positioned centrally but non-collinearly with respect to apertures 22.

Figure 4:
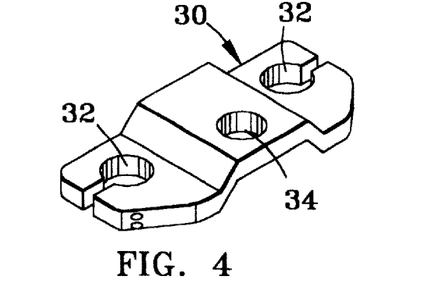
FIG. 4 shows an isometric view of third suspension component in accordance with the present invention.

FIG. 4 shows a third triple clamp 30 that is not a part of the steering frame 6 but is discussed here for clarity. The third triple clamp 30 is similar to the "dove wing" triple clamp 20 except that the intermediate section is now raised from the side sections. The third triple clamp 30 includes two adjustably sized apertures 32 and a central aperture 34, which is non-collinear with apertures 32. The significance of the third triple clamp will be discussed below.

With regard to all of the triple clamps, while some are shown as bent or cast clamps with raised or lowered central areas, it should be noted that flat or bent/cast triple clamps can be used throughout the device. In the embodiment shown in FIG. 1, the bent triple clamps are provided to accommodate a shock absorber 50, discussed below. Accordingly, depending on the size of the shock absorber 50 used, a variety of differently bent/cast or flat triple clamps may be used without departing from the scope of this invention. The triple clamps are composed of, e.g., steel or aluminum.

In order to provide upper shock absorption, a variety of shock absorbing members may be provided. First, the sleeves 71, 72 may be closed off at their upper ends, e.g., a plate welded across their upper openings. Furthermore, similarly to the lower shock absorber, the sleeves 71, 72 may be sealed off by seals 71b, 72b so as to form a shock absorbing chamber with the upper ends 1a, 2a of the elongate members 1, 2. The sealed chambers so created can be filled with a pressurized fluid, e.g. air or hydraulic fluid, and connected to pressurized fluid reservoirs if desired. Alternatively, as shown in FIG. 7, the upper ends 1a, 2a of the elongate members can be provided with pistons 103, 104 to provide a dual direction spring-based shock absorbing system via springs 90 and 92, as discussed above.

Second, in addition to or replacement of the shock absorbing system created by the sleeves 71, 72 and the upper ends 1a, 2a of the elongate member 1, 2, an upper shock absorber 50 is provided within the steering frame 6. In the alternative that the shock absorber 50 is the only shock absorption system to be used, the sleeves 71, 72 may be open, non-shock absorbing systems. The shock absorber 50 is provided as a: hydraulic piston/cylinder system, pneumatic piston/cylinder system or spring-based system.

When the shock absorption is provided by sealed sleeves 71, 72 alone, steering is provided by a conventional steering stem (not shown) located in the central openings 14, 24 of the triple clamps 10, 20, respectively. The bearing being connected to the vehicle frame 60 with the upper triple clamp 10 including a handle bar clamp 5 for a handle (not shown) for steering of the steering frame 6 and entire suspension by an operator. However, when the upper shock absorber 50, as shown in FIG. 1, is provided, the steering stem or shaft is not used. Accordingly, in accordance with the present invention, the upper shock absorber 50 is constructed in such a way as to accommodate shock absorption for motion of the elongate members 1, 2 and steerability of the steering frame 6 and the entire suspension.

In order to provide shock absorption, an upper end (e.g., an uppermost end of a cylinder end of a piston/cylinder system) of the upper shock absorber 50 is attached to the center aperture 14 of the upper triple clamp 10. The lower end (e.g., a rod 54 end of the piston/cylinder system) of the upper shock absorber 50 is attached to the center aperture 34 of the third triple clamp 30. Furthermore, an intermediate portion (e.g., a lowermost end of a cylinder end of a piston/cylinder system) is attached to the second triple clamp 20 such that the rod 54 of the piston/cylinder system is movable freely through the center aperture 24 of the triple clamp 20.

As will be evident to one having ordinary skill in the art, the upper shock absorber 50 can also be reversed, i.e., such that the cylinder of the upper shock absorber 50 is attached to the third triple clamp 30 and the rod 54 is fixed to the second triple clamp 20 and the the upper triple clamp 10.

In order to provide steering of the vehicle, the upper shock absorber 50 is connected to the vehicle frame 60 with a pair of spaced tapered roller bearings (e.g., Timkin™ bearings) 56, which allow rotational movement of upper shock absorber 50, and hence the steering frame and entire suspension, relative to the vehicle frame 60. A handle bar can be attached to the steering frame 6 by a handle bar clamp 5 attached to the upper triple clamp 10. Accordingly, an operator of the vehicle can steer the suspension by turning of the handle bar (not shown) to turn the steering frame and the entire suspension about the bearings 56. Bearing seals 58 may also be provided between the bearings 56 and triple clamps 10, 20.

Figure 5:
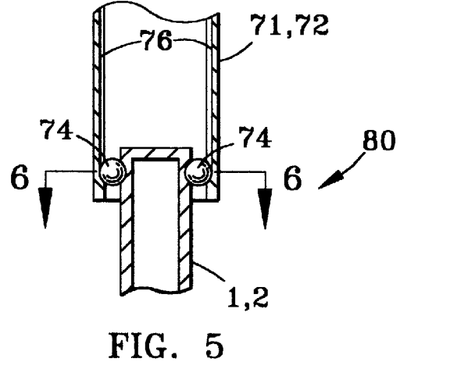
FIG. 5 shows a partial cross-sectional view of an alternative embodiment for a component of the suspension in accordance with the present invention.
Figure 6:
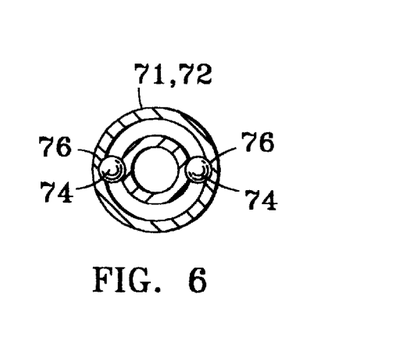
FIG. 6 shows a cross-sectional view 6—6 of the FIG. 5 component.

FIGS. 5 and 6 show an alternative embodiment for the sleeves' 71, 72 and elongate members' 1, 2 telescopic connections. In this alternative, to aid in the sliding action, a bearing 80 is provided between the sleeves 71, 72 and elongate members 1, 2. In particular, the sleeves 71, 72 are constructed to receive ball bearings 74 in a pair of slots 76 formed on an interior thereof. The ball bearings 74 are rotatably encapsulated in the outer periphery of elongate members 1, 2 such that they can rotate between the elongate members 1, 2 and sleeves 71, 72 when the elongate members move within the sleeves 71, 72. Hence, the ball bearings 74 and slots 76 guide and aid in the sliding motion of the elongate members 1, 2 within the sleeves 71, 72. The chamber is sealed such that any fluid provided in the chamber does not escape by a seal (not shown).

In operation, the lower shock absorber 41, 42 and upper shock absorber 50 and/or 71, 72 absorb shock on the vehicle caused by terrain being covered. The upper and lower shock absorbers can be set to different compression forces so that when one shock absorber reaches maximum absorption, e.g., "bottoms out", the other shock absorber can take over at a higher compression. Alternatively, the shock absorber sets can be set at substantially the same compression such that the sets act independently but tend to react symmetrically.

Figure 9:
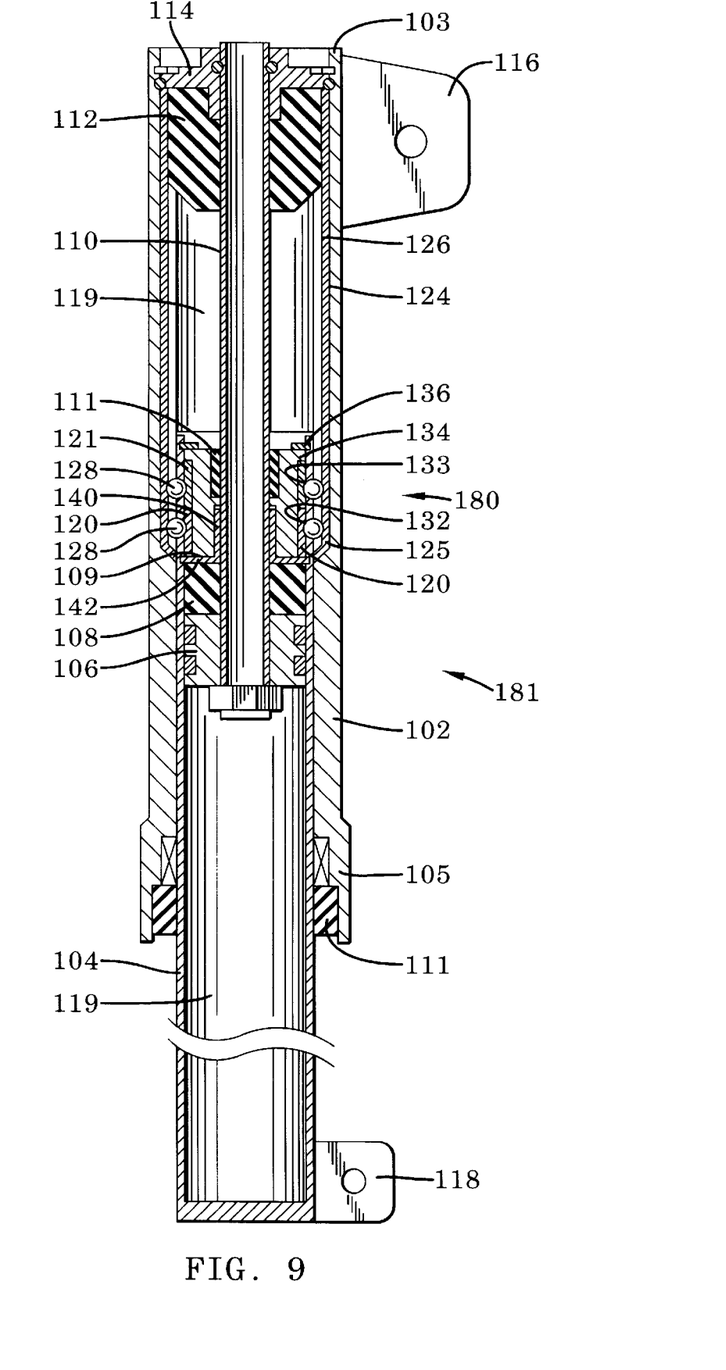
FIG. 9 shows a partial cross-sectional view of a second embodiment of the bearing shown in FIGS. 5 and 6 and a suspension incorporating the bearing.
Figure 10:
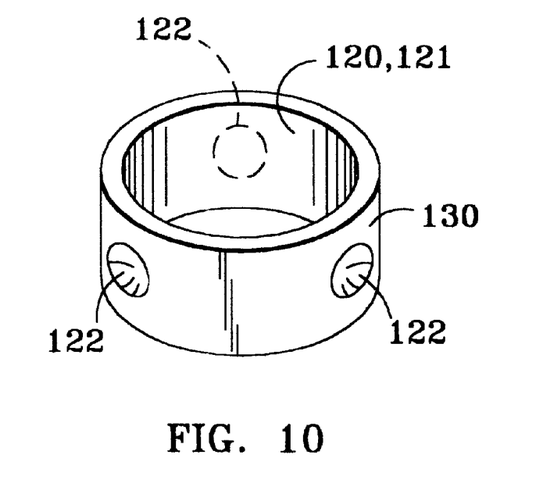
FIG. 10 shows an isometric view of a collar shown in FIG. 9.
Figure 11:
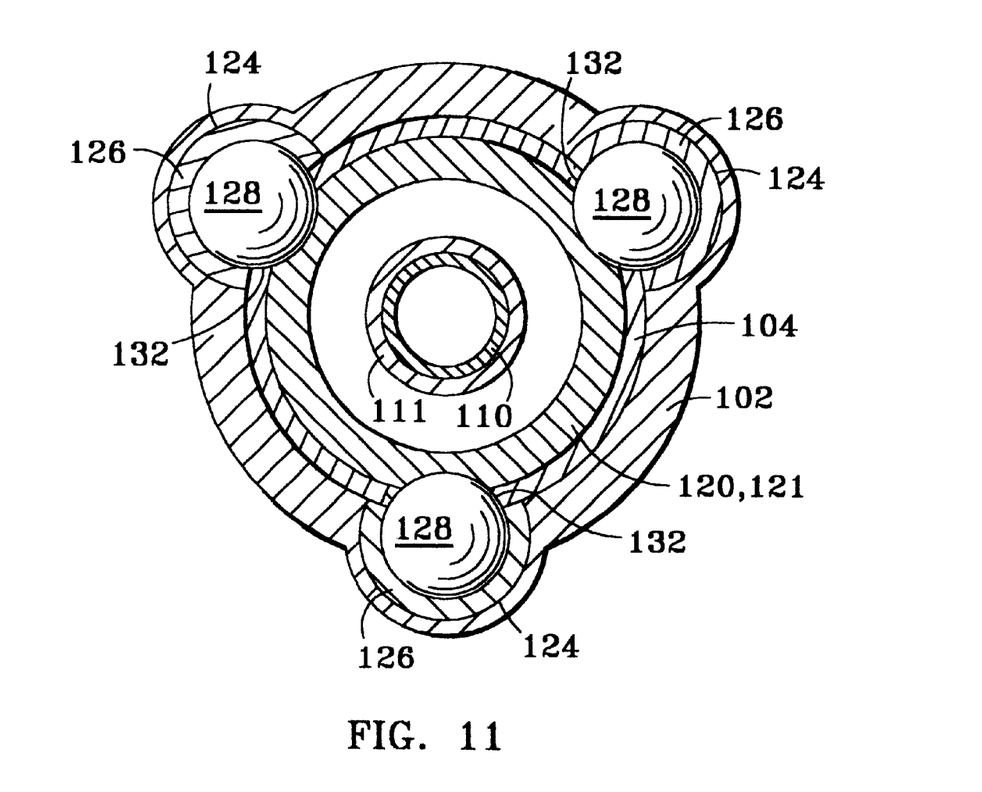
FIG. 11 shows a cross-sectional view of an alternative of the FIG. 9 bearing.
Figure 12:
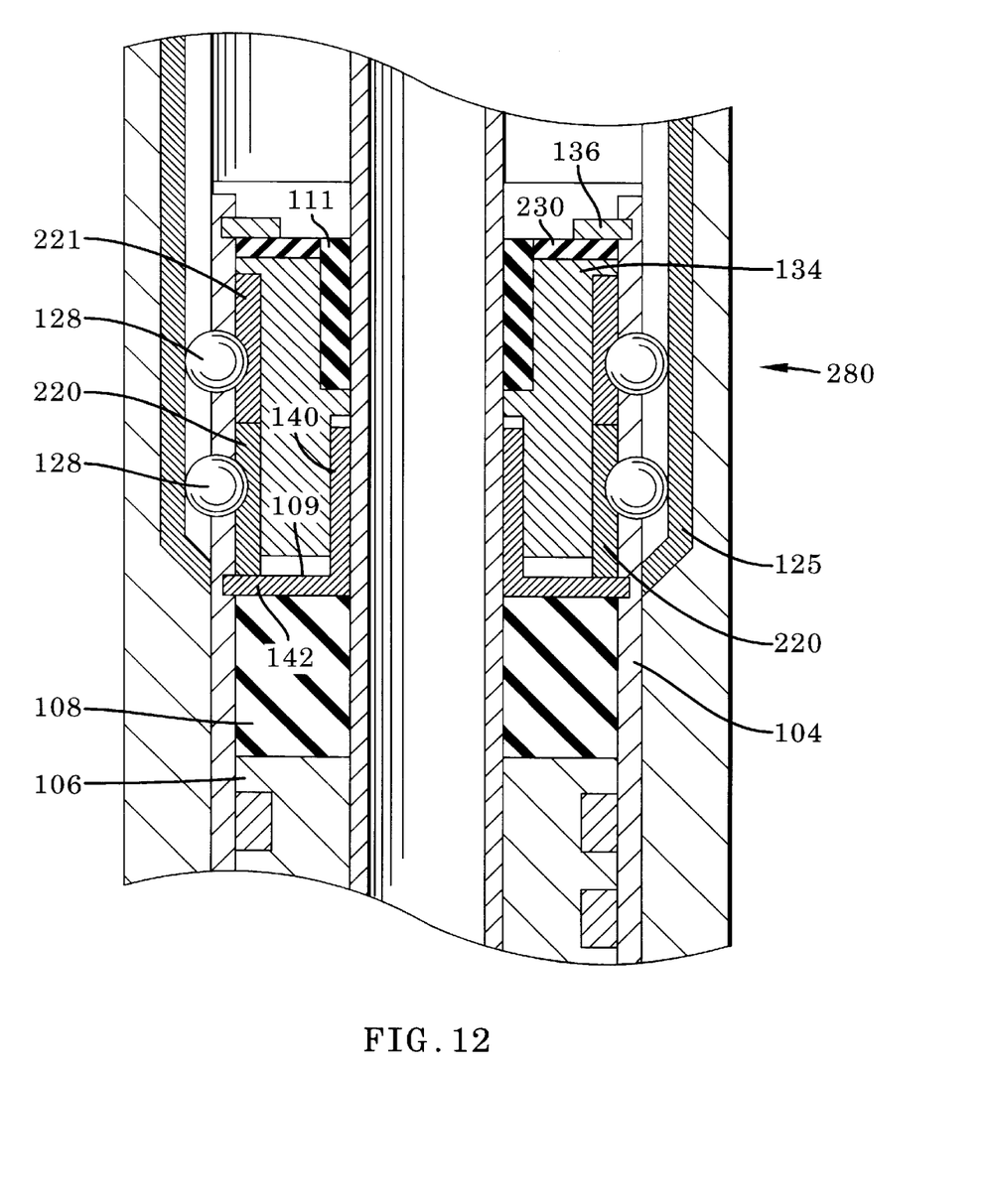
FIG. 12 shows a cross-sectional view of a third embodiment of the bearing shown in FIGS. 5 and 6.

Referring to FIGS. 9–11, a second embodiment of the bearing 80 shown in FIGS. 5 and 6 is illustrated. In this embodiment, bearing 180 provides a more stable guide or translational bearing by the use of a collar 120, described in more detail below. While bearings 80, 180 are described in the setting of a vehicle suspension, it should be recognized that bearings 80, 180 are described in this setting for illustrative purposes only, i.e., each have other uses beyond a vehicle suspension.

As shown in FIGS. 9 and 11, bearing 180 includes a first outer sleeve or member 102 which telescopically receives a second inner sleeve or member 104. First and second member 102, 104 are slidable relative to one another and are preferably substantially tubular. In the setting of a suspension, first member 102 and second member 104 generally form a vehicle suspension or piston-cylinder shock absorber 181 including, inter alia, a piston head 106, elastomeric bumper 108, a collar fitting 109, piston stem 110, seals 111, rubberized bumper 112, closure 114, wheel connection 116 and vehicle frame connection 118. Chambers 119 formed within members 102, 104 can be fluidly pressurized or contain compression springs as is known in the art to form a vehicle suspension 181, i.e, first member 102 becomes a cylinder and second member 104 becomes a rod of a suspension or shock absorber 181. Second member 104 includes a substantially smooth exterior surface that is sealed by seals 111 in first member 102. Hence, the suspension 181 does not require a rubber boot.

First member 102 includes at least one, and preferably two, slots or bearing tracks 124 on an interior thereof. Each bearing track 124 is preferably a generally rounded opening on an interior surface of first member 102 and are shaped to complementarily receive a rolling element 128. Rolling elements 128 are preferably ball bearings. As shown, each bearing track 124 is linear. However, it is possible for each bearing track 124 to spiral, if desired. Each bearing track 124 may also preferably include complementary a bearing track race 126 to prevent wear of each bearing track 124. In this setting, each bearing track 124 is shaped to accommodate a bearing track race 126. Each race 126 is shaped to complement the interior of a bearing track 124 on one side and to accommodate rolling elements 128 on another side. Each race 126 allows for increased longevity of bearing 180 because they are replaceable when they become worn. Each bearing track 124 extends from a first end 103 of first member 102 to an end point 125 distal a second end 105 of first member 102. End point 125 prevents the disassembly of suspension 181 as will be described below.

Second member 104 includes a set of first bearing openings 132 therein. Bearing openings 132 are shaped to receive, support and allow rotation of a rolling element 128 therein. Each bearing opening 132 is positioned in second member 104 to register with a bearing track 124 of first member 102 for reasons to be explained below.

As mentioned above, bearing 180 includes a collar 120 that provides for a more stable translational guide bearing. Collar 120, shown in detail in FIG. 10, is a generally tubular member having rolling element seats 122 positioned in an exterior surface 130. One seat 122 is positioned to register with each bearing opening 132/rolling element 128 of second member 104 for reasons to be explained below. Seats 122 are also shaped (e.g., rounded or cupped, etc.) to rotatably receive a rolling element 128 therein.

As shown in FIGS. 9 and 11, collar 120 is preferably concentrically positioned within second member 104. Collar 120 may be secured in a variety of ways. For instance, by welding collar 120 to second member 104. Alternatively, a collar holder or seat 134, shown in FIG. 9, may be provided to hold collar 120 within second member 104. Holder 134 is held in position by, e.g., a clip 136, welding, etc. Also, holding collar 120 in position is collar fitting 109. Fitting 109 includes a tubular portion 140 that mates and is slidable relative to piston stem 110 and a flanged portion 142 that is secured in place within second member 104, e.g., keying (as shown), welding, etc.

Bearing 180, as shown in FIG. 9, may also include a second collar 121 substantially identical to collar 120 and adjacent thereto. Collar 121 could also be longitudinally spaced from collar 120 depending on allowable space. In this setting, bearing 180 would include a set of second rolling element openings 133 in second member 104 in registration with each bearing track of first member 102, i.e., adjadent or longitudinally spaced from first bearing openings 132. Collar 121 would be positioned in second member 104 in a similar fashion as that of collar 120 to have its seats 122 register with the set of second rolling element openings 133 in second member 104. If holder 134 and fitting 109 are used, they would also hold second collar 121, as shown in FIG. 9.

In operation, first member 102 and second member 104 telescope relative to one another. Rolling elements 128 are rotatably held in position in second member 104 and allowed to rotate with support from collar(s) 120, 121. As first and second member 102, 104 telescope, each bearing track race 126 within a bearing track 124 guides rolling elements 128 and prevents torquing of members 102, 104. Disassembly or dislodgement of second member 104 from first member 102 is prevented by engagement of rolling elements 128 with end point 125 of bearing tracks 124. When bearing 180 is used with a suspension 181, it thus provides a safer suspension 181 by improving slidability, preventing accidental disclodgement and resisting torque in suspenion members.

Referring to FIGS. 12–15, a third embodiment of the bearing is illustrated. In this setting, a compression mechanism 230 is positioned between collar holder 134 and clip 136. Compression mechanism 230 preferably is in the form of an elastomeric member but can take other forms such as a spring or spring system. Collar holder 134 and fitting 109 are shortened slightly at their normally abutting ends and clip 136 and fitting 109 are positioned such that compression mechanism 230 is compressed. This compression acts on fitting 109 and collar holder 134 to force fitting 109 and collar holder 134 towards one another. As a result, collars 220, 221 are also longitudinally forced together.

Figure 13:
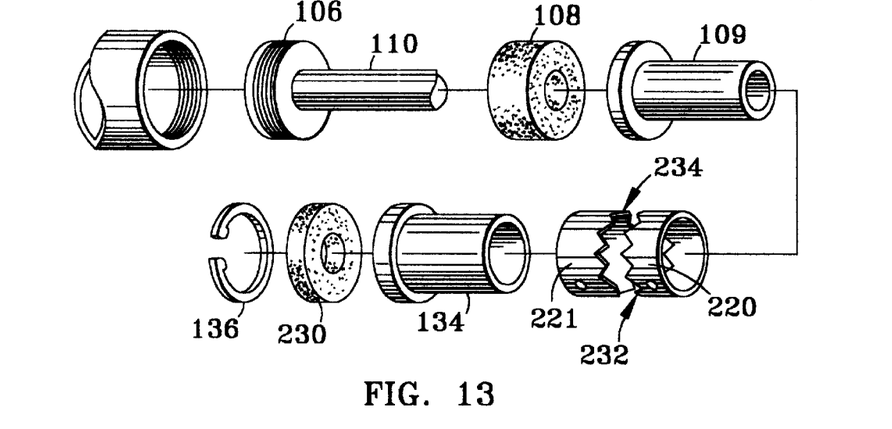
FIG. 13 shows an exploded view of the bearing of FIG. 12.
Figure 14:
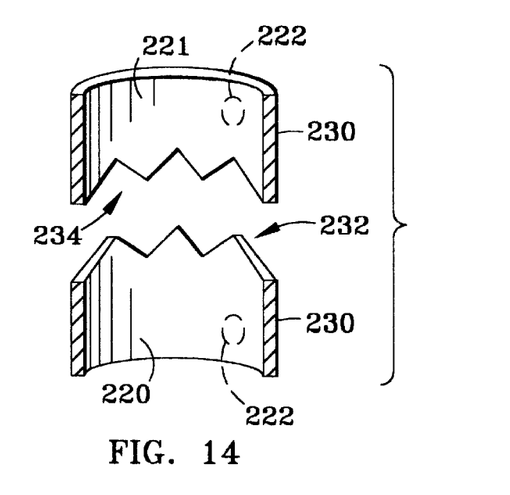
FIG. 14 shows a cross-sectional view of a collar pair of the bearing of FIG. 12.
Figure 15:
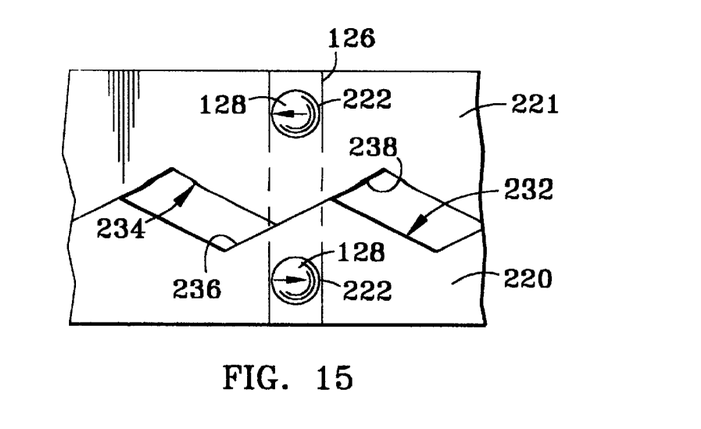
FIG. 15 shows a schematic view of the collar pair of FIG. 14 in engagement.

As shown in FIGS. 13–15, collars 220, 221 are modified to transform the longitudinal force acting on collars 220, 221 to a counteracting rotational force, which provides a more even wearing on each bearing track race 126. In order to create this counteracting rotational force, a rotational counteracting mechanism is employed. In one preferred embodiment, the rotational counteracting mechanism includes sawtooth edges 232, 234 on mating ends of collars 220, 221. As best shown in FIG. 15, sawtooth edges 232, 234 are positioned relative to one another such that an angled sliding surface 236 of sawtooth edge 232 slidingly mates with an angled sliding surface 238 of sawtooth edge 234. As the edges 232, 234 are pressed together, sliding surfaces 236, 238 slidingly mate to transform the longitudinal force into an oppposing rotational force on collars 220, 221. This force is transferred to seats 222 and rolling elements 128. The effect is that rolling elements 128 are forced in opposing rotational directions as indicated by arrows in FIG. 15. The counteracting forces created provide a more even wearing on each bearing track race 126.

It should be recognized that other mechanisms to create the counteracting rotational force other than the particular rotational counteracting mechanism disclosed above may be employed. For instance, an angled member (not shown) such as a spring, screw, piston, etc. that extends from one collar 220, 221 into the other collar 220, 221 to force them in opposing rotational directions, may be employed. Furthermore, sawtooth edges 232, 234 may also take other shapes, e.g., wavy, and not depart from the scope of the invention.

The above described bearing provides a system by which two members can be slidably mated and allow resistance to torque while also assuring slidability of its members and even wear by its rolling elements against mating members.

Figure 16:
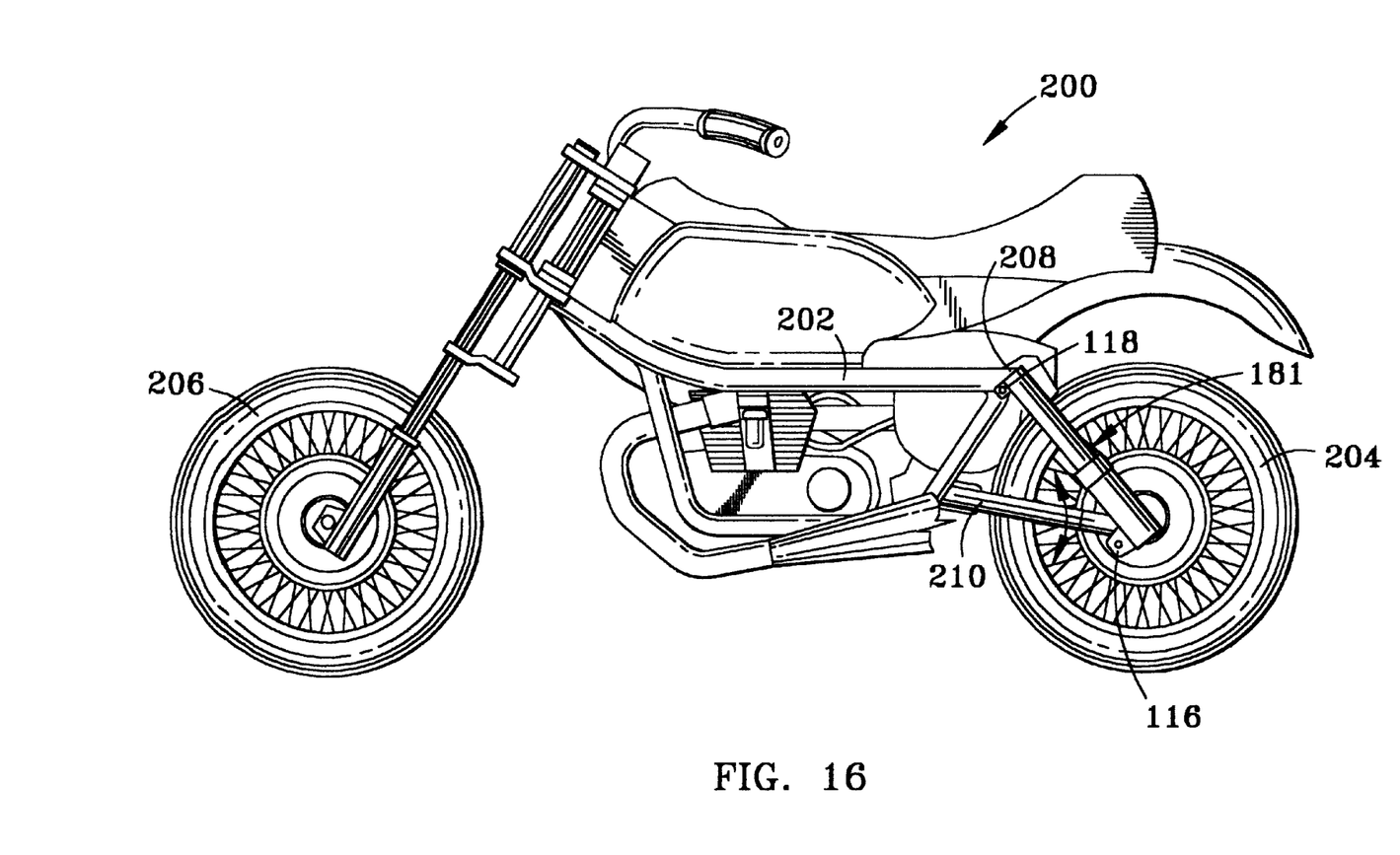
FIG. 16 shows a vehicle incorporating the suspension of FIG. 9.

Referring to FIG. 16, a wheeled vehicle 200 incorporating a vehicle suspension 181 in accordance with the invention is disclosed. Wheeled vehicle 200 includes a vehicle frame 202 having at least one wheel 204, 206. As shown, suspension 181 is coupled to a stationary member 208 by vehicle frame connection 118 and a pivotal rocker arm 210 by wheel connection 116. Pivotal rocker arm 210 is coupled to wheel 204. Suspension 181 cushions the undulations experienced by wheel 204 and rocker arm 210 during movement of vehicle 200.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

In particular, while the first embodiment of the present invention has been described in conjunction with a front fork of a two wheeled vehicle, it is not to be limited to a motorcycle or bicycle suspension. As should be self-evident, the present invention can be utilized on any wheel, front or back, on any vehicle without departing from the general teachings of the invention. This statement also applies to the second embodiment. Furthermore, while the first embodiment of the invention has been described with regard to a forked suspension, it should not be limited to such a suspension because it is envisioned that the teachings of the present invention may be applied to a single membered suspension. As one with ordinary skill in the art will readily recognize, such a suspension is easily obtainable by removal of one side of the suspension, e.g., by removal of elongate member 2, sleeve 72, and lower shock absorber 42. In this situation, the clamps 10, 20 and 30 would also be shortened by removal of one set of apertures.

With regard to bearings 80, 180, 280 and vehicle suspension 181, it should be recognized that the number of rolling elements 128, bearing tracks 124, bearing track races 126, and bearing openings 132 around first member 102 and second member 104 may vary. For instance, FIG. 9 shows two sets equidistantly spaced around members 102, 104, while FIG. 10 shows three sets equidistantly spaced around members 102, 104. Furthermore, while rolling elements 128 have been disclosed as ball bearings, it is possible that they take other forms, e.g., a cylindrical or tapered roller, a needle roller, etc. This, obviously, assumes alterations are made to first and second members 102, 104, bearing tracks 124, bearing track races 126 and collar 120, 121 to accommodate the different rolling elements. It is also envisioned that collar(s) 120, 121 could be integrally formed with member 104, if desired. Further, while bearings 80, 180, 280 are preferably made of a metallic material, it should be recognized that other materials, such as hard plastics could be used in special circumstances.

Relative to the third embodiment, it should be recognized that compression mechanism 230 and clip 136 could be replaced by other mechanisms which provide compression and retention. For instance, clip 136 can be a threaded plug matable with the end of second member 104, and compression mechanism 230 could be a spring or spring system. Further, as one having ordinary skill in the art should recognize, collar holder 134 and fitting 109 may take a variety of different forms and still provide the collar seating and compression surfaces necessary to force collars 220, 221 together. Other components can be provided in different manners. For instance, elastomeric member 106 can be formed as an integral body with seal 111.

I claim:

1. A bearing comprising:
   a first member having at least one bearing track, each bearing track adapted to rotatably guide a rolling element received therein;
   a second member telescopically arranged with the first member and having a first rolling element opening in registration with each bearing track of the first member, each first rolling element opening rotatably receiving a rolling element therein; and
   a first collar positioned within the second member and having a rolling element seat for each rolling element, each seat rotatably receiving a rolling element therein.

2. The bearing of claim 1, wherein the first collar is concentrically positioned with the second member.

3. The bearing of claim 1, further comprising:
   a second collar adjacent the first collar; and
   a second rolling element opening in the second member in registration with each bearing track of the first member, each second rolling element opening rotatably receiving a rolling element therein.

4. The bearing of claim 1, wherein each bearing track is a rounded opening on an interior of the first member.

5. The bearing of claim 1, wherein each bearing track includes a complementary bearing track race to receive a rolling element and prevent wear of the bearing track.

6. The bearing of claim 1, wherein the rolling elements are ball bearings and the seats are shaped to rotatably receive the ball bearings.

7. The bearing of claim 1, wherein the first member has a first end and a second end and each bearing track extends from the first end to an end point distal the second end.

8. The bearing of claim 7, wherein the second member is prevented from sliding out of the first member by the rolling elements engaging the end point of a bearing tracks.

9. The bearing of claim 1, further comprising a collar holder coupled to the second member to hold the first collar in position within the second member.

10. A vehicle suspension adapted to be coupled to a wheel comprising:
    a first member having at least one bearing track, each bearing track adapted to rotatably guide a rolling element received therein;
    a second member telescopically arranged with the first member and having a first rolling element opening in registration with each bearing track of the first member, each first rolling element opening rotatably receiving a rolling element therein;
    a first collar positioned within the second member and having a rolling element seat for each rolling element, each seat rotatably receiving a rolling element therein; and
    wherein one of the first and second members is coupled to a wheel and the other member is coupled to a frame of a vehicle.

11. The vehicle suspension of claim 10, wherein the first collar is concentrically positioned with the second member.

12. The vehicle suspension of claim 10, further comprising:
    a second collar adjacent the first collar; and
    a second rolling element opening in the second member in registration with each bearing track of the first member, each second rolling element opening rotatably receiving a rolling element therein.

13. The vehicle suspension of claim 10, wherein each bearing track is a rounded opening on an interior of the first member.

14. The vehicle suspension of claim 10, wherein each bearing track includes a complementary bearing track race to receive a rolling element and prevent wear of the bearing track.

15. The vehicle suspension of claim 10, wherein the rolling elements are ball bearings and the seats are shaped to rotatably receive the ball bearings.

16. The vehicle suspension of claim 10, wherein the first member has a first end and a second end and each bearing track extends from the first end to an end point distal the second end.

17. The vehicle suspension of claim 16, wherein the second member is prevented from sliding out of the first member by the rolling elements engaging the end point of a bearing track.

18. The vehicle suspension of claim 10, further comprising a collar holder coupled to the second member to hold the collar in position within the second member.

19. The vehicle suspension of claim 10, wherein each bearing track is linear.

20. The vehicle suspension of claim 10, wherein the second member is telescopically positioned within the first member and includes a smooth exterior surface that is sealed by a seal provided in the first member.

21. A bearing comprising:

a stationary outer member having three bearing tracks on an interior of the stationary outer member;

a bearing track race received in each bearing track to prevent wear of the bearing track and rotatably guide a rolling element received therein;

a moving inner member having a rolling element opening in registration with each bearing track, each opening rotatably receiving a rolling element therein; and a first collar coupled to the moving inner member and having a rolling element seat for each rolling element, each seat rotatably receiving a rolling element therein.

22. The bearing of claim 21, wherein the stationary outer member, collar and moving inner member are substantially tubular.

23. A bearing comprising:

a first collar;

a second collar;

at least one rolling element seat positioned in each collar for receiving a rolling element therein; and a rotational counteracting mechanism to force the first collar and the second collar in opposing rotational directions.

24. The bearing of claim 23, wherein the rotational counteracting mechanism includes:

a first angled sliding surface on an end of the first collar;

a second angled sliding surface on an end of the second collar that is slidingly matable with the first angled sliding surface;

a compression mechanism to apply a longitudinal force to the first and second collars to force them longitudinally together; and wherein the first sliding surface and second sliding surface slidingly mate to transform the longitudinal force into a counteracting rotational force.

* * * * *